United States Patent [19]

Shieh et al.

[11] Patent Number: 4,995,197

[45] Date of Patent: Feb. 26, 1991

[54] METHOD OF ABRADING

[76] Inventors: Chiung-Huei Shieh, 5 Philbrook Ter., Lexington, Mass. 02173; John M. Funt, 11 Bryon Dr., Nashua, N.H. 03062; George B. Ouyang, 127 Follen Rd., Lexington, Mass. 02173

[21] Appl. No.: 471,552

[22] Filed: Jan. 29, 1990

[51] Int. Cl.$^5$ ................................................ B24B 1/00
[52] U.S. Cl. ............................... 51/281 R; 51/289 R; 51/165 R; 73/8; 73/9
[58] Field of Search ................ 51/281 R, 289 R, 326, 51/327, 165 R, 88, 89, 103, 104, 105, 106; 73/8, 9

[56] References Cited

U.S. PATENT DOCUMENTS

| | | | |
|---|---|---|---|
| 3,893,330 | 7/1975 | Shute et al. | 73/9 |
| 3,899,917 | 9/1975 | Kisbany | 51/106 R |
| 4,779,447 | 10/1988 | Rath | 73/9 |

OTHER PUBLICATIONS

Letter from John M. Funt to Users of Cabot Abrader Data, dated Jan. 19, 1988, (Exhibit B).
Declaration of Chiung-Huei Shieh, John M. Funt, and George B. Ouyang, (Exhibit A).
Declaration of John M. Funt, (Exhibit C).
Carbon Black and Tire Wear Slides, dated Fall 1988, (Exhibit D).
Encyclopedia of Polymer Science and Technology, vol. 1, Second Edition, 1985.
Encyclopedia of Polymer Science and Technology, vol. 1, First Edition, 1964.
Paper No. 41 to the American Chemical Society, Division of Rubber Chemistry, Miami Beach, Florida, Apr. 1971, Entitled "Studies on Abrasion and Traction Using the Scanning Electron Microscope," by B. B. Boonstra, F. A. Heckman and A. Kabaya, Apr., 1971.
Tire Science and Technology 2 (4), (1974), Entitled "Traction-Abrasion Relationships of Tread Compounds Containing New Reinforcing Carbon Blacks," by B. B. Boonstra.
International Polymer Science and Technology, vol. 16, No. 2, 1989, entitled "Test Methods and Equipment for Abrasion and Friction of Rubber," by K. Mitsuhashi.

*Primary Examiner*—Frederick R. Schmidt
*Assistant Examiner*—M. Rachuba

[57] ABSTRACT

A method of abrading a tire tread compound to measure its irregular wear characteristics, includes the steps of abrading each of a plurality of sample wheels in rotating engagement with a respective abrasive member. An outer layer of each sample wheel is made of a tire tread compound to be abraded. The velocity of the sample wheels relative to the velocity of the abrasive members defines a first slip value. Each sample wheel is abraded in rotating engagement with a plurality of abrasive members at the first slip value. The loss of the tire tread compound of each sample wheel at the first slip value is then measured. Each sample wheel is then abraded in rotating engagement with a plurality of respective abrasive members at a second slip value. The loss of the tire tread compound of each sample member at the second slip value is then measured. Each sample wheel is then abraded in rotating engagement with a plurality of respective abrasive members at a third slip value. The loss of the tire tread compound due to abrasion at the third slip value is then measured. The second slip value causes a higher level of abrasion severity than the first slip value. The third slip value in turn causes a higher level of abrasion severity than the second slip value. The irregular wear characteristics of the tire tread compound is measured based on the loss of the compound due to abrasion at each of the different slip values.

26 Claims, 5 Drawing Sheets

FIGURE 2 (A-A)

METHOD OF ABRADING

FIELD OF THE INVENTION

The present invention relates to methods of abrading. More particularly, the present invention relates to methods of abrading tire tread compounds or other types of rubber compounds, to measure the wear rate, wear resistance and/or abrasion resistance of the compounds under different wear severity conditions.

BACKGROUND INFORMATION

Known methods and apparatus for abrading tire tread compounds or other types of rubber compounds, generally employ a moving abrasive surface. A sample of the compound is engaged with the moving abrasive surface to be abraded. The amount of material abraded from the sample is then measured to predict the wear rate, wear resistance and/or abrasion resistance of the tire tread compound under actual tire wear, or other abrading conditions.

One problem with known abrading methods and apparatus is that abrasion data is provided to predict tread wear at one level, or an average level of abrasion severity. However, for some tire tread compounds, the relative tread wear characteristics may vary dramatically at different levels of abrasion severity. For example, some tire tread compounds demonstrate high tread wear capabilities at low severity levels of abrasion, while demonstrating very poor tread wear capabilities at high severity levels of abrasion. As a result, known abrading apparatus and methods that abrade at only one level, or an average level of abrasion severity, frequently provide misleading abrasion data.

For example, if such an apparatus or method is used to test a tire tread compound at a low level of abrasion severity, it may indicate excellent tread performance while, in fact, at high severity levels of abrasion the same compound may provide very poor tread performance. If such a tire tread compound were then used to make a tire and subjected to high severity abrasion, such as a performance car tire, the tire would likely exhibit a high wear rate and/or develop an irregular wear pattern.

One problem with tire tread compounds that exhibit widely different wear rate characteristics at different levels of abrasion severity, is that tires made from such compounds frequently develop irregular wear patterns. It has been determined that irregular wear is often caused by the uneven distribution of stress in the tread of the tire. If the tire tread compound exhibits low abrasion resistance at high severity levels of abrasion, then the sections of the tire subjected to the higher levels of severity or stress will wear faster than the other sections of the tire. As a result, such tires frequently develop irregular wear patterns that substantially decrease the life of the tire.

Therefore, it can be critical to test the abrasion characteristics of tire tread compounds at both high and low severity levels of abrasion. Because known methods and apparatus have not been used to perform this function, such compounds are usually tested by actual tire tests on road vehicles under both high and low severity abrasion conditions, which is a time-consuming and expensive procedure.

It is an object of the present invention, therefore, to overcome the problems and drawbacks of known methods of abrading.

SUMMARY OF THE INVENTION

The present invention is directed to a method of abrading a tire tread compound to measure the irregular wear characteristics of the compound. The method of the present invention includes the steps of weighing at least two sample wheels, wherein each sample wheel includes a tire tread compound. Each sample wheel is abraded by being rotated in engagement with a respective grindstone, wherein the relative velocities of the sample wheels and the grindstones define a first slip value. The weight of each sample wheel is then measured again to measure the abrasion resistance of the compound at the first slip value.

The sample wheels are then abraded by rotating each sample wheel in engagement with a respective grindstone at a second slip value. The second slip value causes a higher level of abrasion severity than the first slip value. The sample wheels are weighed again to measure the abrasion resistance of the compound at the second slip value. The sample wheels are then abraded by rotating each sample wheel in engagement with a respective grindstone at a third slip value. The third slip value causes a higher level of abrasion severity than the second slip value. The sample wheels are then weighed again to measure the abrasion resistance of the compound at the third slip value. The abrasion resistance of the tire tread compound at the different levels of abrasion severity thus indicates the irregular wear characteristics of the tire tread compound.

In accordance with one method of the present invention, each slip value is based on the difference between the velocities of the sample wheels and grindstones divided by the velocity of the sample wheels. The first slip value is within the range of about 5 to 9%; the second slip value is within the range of about 9 to 17%; and the third slip value is within the range of about 17 to 30%. Preferably, the first slip value is about 7%, the second slip value is about 13%, and the third slip values about 21%.

The present invention is also directed to method of abrading a carbon black containing compound to measure its irregular wear resistance. The method includes the steps of abrading each of a plurality of sample members in rotating engagement with a respective abrasive member, wherein a layer of each sample member is made of a carbon black containing compound. The velocity of the sample members relative to the velocity of the abrasive members defines a first slip value. The sample members are then abraded in rotating engagement with at least one other abrasive member at the first slip value. The loss of the carbon black containing compound of each sample member at the first slip value is then measured.

The sample members are then abraded in rotating engagement with respective abrasive members at a second slip value. The second slip value causes a greater degree of abrasion severity than the first slip value. Each sample member is then abraded in rotating engagement with at least one other abrasive member at the second slip value. The loss of the carbon black containing compound of each sample member at the second slip value is then measured.

The sample members are then abraded in rotating engagement with respective abrasive members at a third slip value. The third slip value causes a greater degree of abrasion severity than the second slip value. Each sample member is then abraded in rotating engagement with at least one other abrasive member at the third slip value. The loss of the carbon black containing compound of each sample member at the third slip value is then measured. The loss of carbon black containing compound of each sample member at the different degrees of abrasion severity thus indicates the irregular wear resistance of the compound.

In a method of the present invention, each slip value is based on the difference in velocity of the sample members and the abrasive members, divided by the velocity of the sample members. The first slip value is within the range of about 5 to 9%. Each sample member is rotated within the range of about 10,000 to 20,000 revolutions with each abrasive member at the first slip value. The second slip value is within the range of about 9 to 17%. Each sample member is rotated within the range of about 1,000 to 5,000 revolutions with each abrasive member at the second slip value. The third slip value is within the range of about 17 to 30%. Each sample member is rotated within the range of about 500 to 5,000 revolutions with each abrasive member at the third slip value.

In a method of the present invention, the ambient temperature of the sample members and abrasive members is controlled to control the degree of abrasion of the sample member. The ambient temperature is preferably maintained within the range of about 40° to 55° C. The volume loss per unit of travel of each sample member at each slip value is calculated. The volume loss is based on the measured weight loss of each sample member and the density of the carbon black containing compound.

Another advantage of the present invention, is that the sample wheels or members are abraded at different slip values, and thus different levels of abrasion severity. Therefore, the degree of irregular wear resistance of the tire tread compound can be predicted based on the measured weights of the sample wheels or members after abrasion at each slip value. Known abrading apparatus, on the other hand, which usually abrade at only one level, or an average level of abrasion severity, generally cannot be used to accurately predict irregular wear resistance.

Other advantages of the present invention will become apparent in view of the following detailed description and drawings taken in connection therewith.

DETAILED DESCRIPTION

Figure 1:
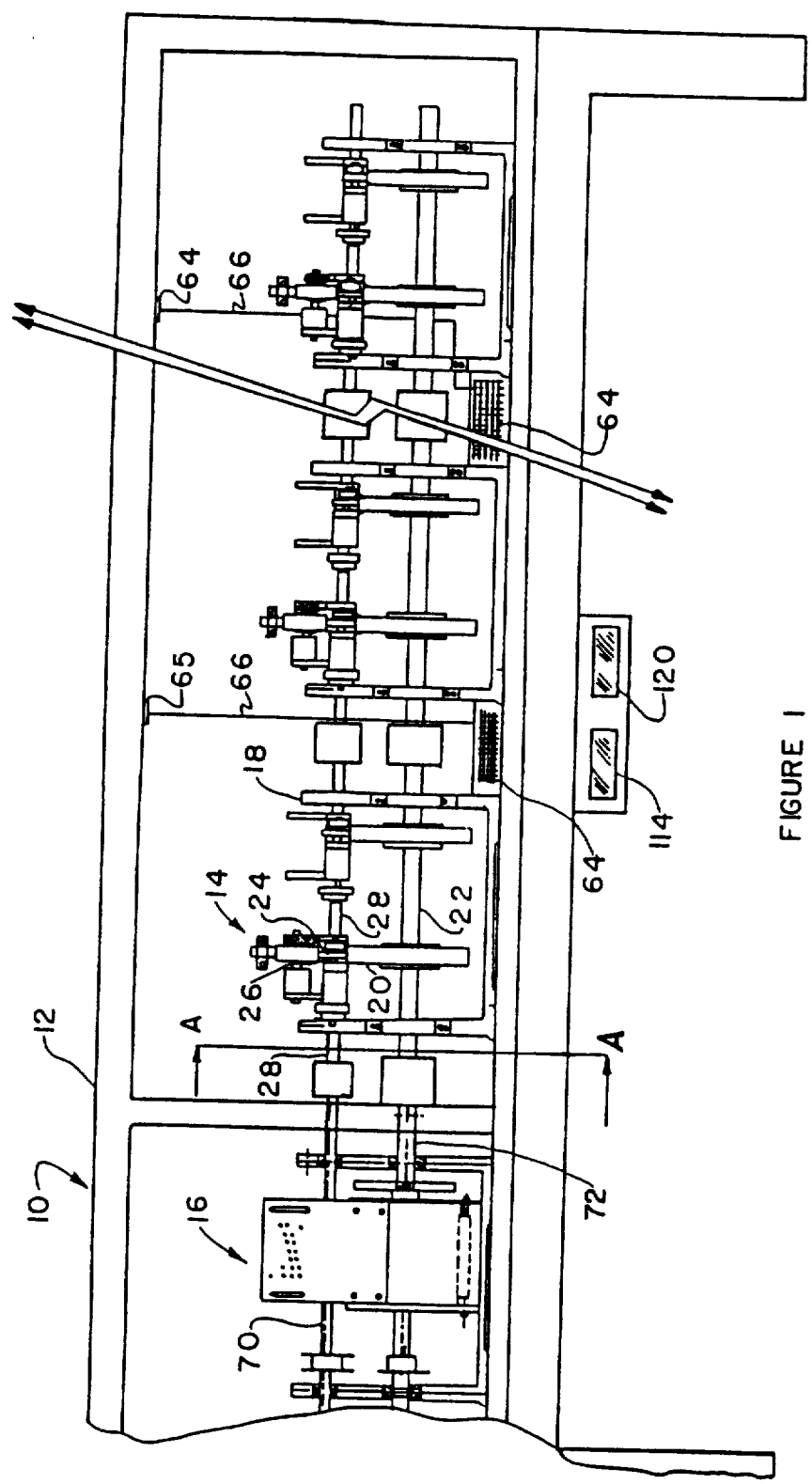
FIG. 1 is a partial front plan view of an abrading apparatus used in accordance with the method of the present invention.

In FIG. 1, an abrading apparatus used in accordance with the method of the present invention is indicated generally by the reference numeral 10. The apparatus 10 comprises a cabinet 12, and twelve test stations 14 (only six shown) mounted end-to-end within the cabinet 12. The apparatus 10 therefore has a right bank and a left bank of test stations 14, each bank including six test stations. The apparatus 10 further comprises a drive module 16 mounted in about the middle of the cabinet 12 to drive the test stations 14, as will be described further below.

Figure 2:
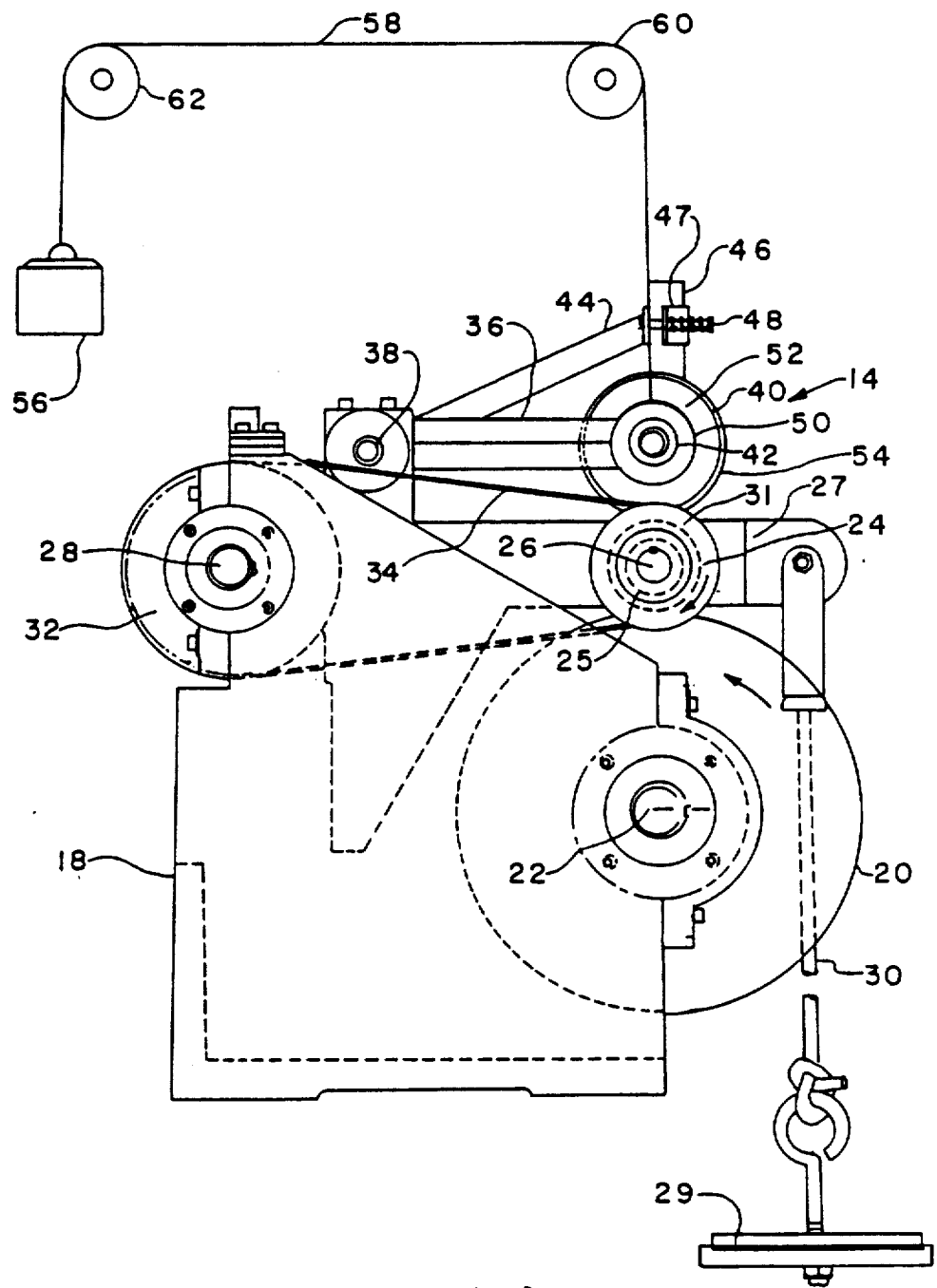
FIG. 2 is an enlarged, side plan view of a test station of the apparatus of FIG. 1 taken along the line A—A.
Figure 3:
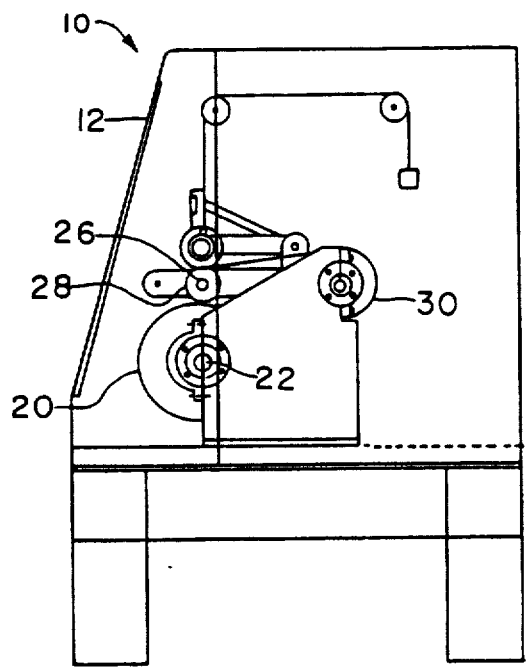
FIG. 3 is a partial cut-away, side plan view of the apparatus of FIG. 1.

Every two test stations 14 are mounted within a test frame 18 which is generally U-shaped, as shown in FIG. 1. In FIG. 2, a typical test station 14 is shown in further detail. The test station 14 comprises a grindstone 20 which is keyed to a grindstone drive shaft 22. The grindstone drive shaft 22 is journaled to the front end of the test frame 18. The grindstone 20 is dulled by conditioning with nylon wheels to remove any sharp projections on its peripheral or abrading surface. By dulling the grindstone 20, cutting abrasion is avoided, which would adversely affect the abrasion tests performed with the apparatus 10.

As shown in phantom in FIG. 2, the test station 14 further comprises a sample wheel 24, which is keyed to a first sample wheel drive shaft 26 immediately above the grindstone 20. The sample wheel 24 comprises a steel core 25 (shown in phantom) and a layer of sample material compression molded over the steel core. The sample material is, for example, a carbon black containing tire tread compound. Typically, the layer of sample material is on the order of about one-half to one-inch thick. The sample wheel 24 is molded by cutting a strip of the tire tread compound and wrapping the strip around the steel core 25. The strip is then compression molded onto the steel core 25 under heat and pressure within a suitable die, in a manner known to those skilled in the art.

As shown in FIG. 2, the sample wheel drive shaft 26 is journaled to the free end of a sample wheel frame 27. The sample wheel frame 27 is in turn journaled on one end to the frame 18 about a second sample wheel drive shaft 28. The second sample wheel drive shaft 28 is journaled to the top, back end of the frame 18. The sample wheel frame 27, therefore, is pivoted about the second sample wheel drive shaft 28, to move the sample wheel 24 into and out of engagement with the grindstone 20. The normal force of the sample wheel 24 against the grindstone 20 is controlled by a counterweight 29. The counterweight 29 is suspended from the free end of the sample wheel frame 27 by a cord 30, as shown in FIG. 2. Thus, the degree of abrasion by the grindstone 20 against the sample wheel 24 can be partially adjusted by adjusting the weight of the counterweight 29.

The test station 14 further comprises a first sprocket 31, which is keyed to the first sample wheel drive shaft 26 adjacent to the sample wheel 24. A second sprocket 32 is keyed to the second sample wheel drive shaft 28 and is located in-line with the first sprocket 31. A sample wheel drive belt 34 is mounted over the first sprocket 31 and the second sprocket 32 to drive the sprockets and, therefore, drive the sample wheel 24. As shown in FIG. 1, the second sample wheel drive shaft 28 is coupled to the drive module 16, and thus drives the sample wheel 24, as will be described further below.

The test station 14 further comprises a dust wheel frame 36, journaled on one end to the sample wheel frame 27 by a bearing support 38. A dust transfer wheel 40 is journaled on the free end of the dust wheel frame 36 by a bearing support 42 and, as shown in FIG. 2, is engageable with the sample wheel 24. The dust wheel frame 36 therefore is pivoted about the bearing support 38 to move the dust transfer wheel 40 into and out of engagement with the sample wheel 24.

The test station 14 further comprises a chalk stick arm 44, which is pivotally mounted on one end to the sample wheel frame 27, adjacent to the dust wheel frame 36. A chalk stick 46 is mounted on the free end of the chalk stick arm 44 by a bracket 47. As shown in FIG. 2, the free end of the chalk stick 46 is maintained in engagement with the dust transfer wheel 40, under the weight of the chalk stick 46 and the chalk stick arm 44. The bracket 47 is clamped over the chalk stick 46 and fastened by a screw 48 to hold the chalk stick in place.

The chalk stick 46 is made preferably from a mixture of magnesium hydroxide, plaster of paris, and demineralized water, and is provided to transfer a light film of chalk dust to the dust transfer wheel 40. Several chalk sticks may be made, for example, by mixing about 170 grams ("gm") of plaster of paris, 80 gm of magnesium hydroxide, and 150 gm of demineralized water. The mixture is then poured into a mold and allowed to harden for about one hour. The chalk is then removed from the mold and heated at about 100° C. for one day. After heating, the chalk is then cut into individual chalk sticks 46.

The dust transfer wheel 40 comprises a rubber core 50 and a foam outer layer 52, which is preferably a polyurethane foam. A rubber band 54, which is about the same width as the rubber core 50, is fitted around the foam outer layer 52. The rubber band 54 is thus maintained in engagement with both the sample wheel 24 and the bottom end of the chalk stick 46. The rubber band 54 receives chalk dust from the chalk stick 46 and, in turn, transfers the chalk dust to the outer surface of the sample wheel 24. The chalk dust is provided to control the surface condition of the interface between the sample wheel 24 and the grindstone 20.

If there is insufficient dusting, an oily layer of degraded sample material will likely build-up on the abrading surface of the grindstone 20, and thus decrease the rate of abrasion of the sample wheel 24. However, if there is too much chalk dust, the dust can prevent effective contact between the sample wheel 24 and the grindstone 20 and, likewise, decrease the rate of abrasion of the sample wheel 24. Therefore, the chalk stick 46 is preferably lightly engaged with the rubber band 54, to maintain a thin film of chalk dust between the sample wheel 24 and grindstone 20. The force exerted by the dust transfer wheel 40 against the sample wheel 24 is controlled by a counterweight 56, as shown in FIG. 2. The counterweight 56 is connected to the dust transfer wheel 40 by a cord 58. The cord 58 is mounted over a first pulley 60 and a second pulley 62, both supported from the cabinet 12 above the frame 18.

The apparatus 10 further comprises several heaters, shown typically as 64 in FIG. 1. The heaters 64 are preferably electric heaters, and are mounted within the cabinet 12 to heat the interior of the cabinet. Thermocouples, shown typically as 65, are also mounted within the cabinet 12. The thermocouples 65 are coupled to the heaters 64 by wires 66, to control the operation of the heaters, and thus maintain a desired temperature within the cabinet 12. Because the relative wear rate can change with tire running temperatures, the temperature within the cabinet 12 can be adjusted (along with the weights of the counterweights 29) to affect the degree of abrasion by the grindstones 20 against the sample wheels 24.

Figure 4:
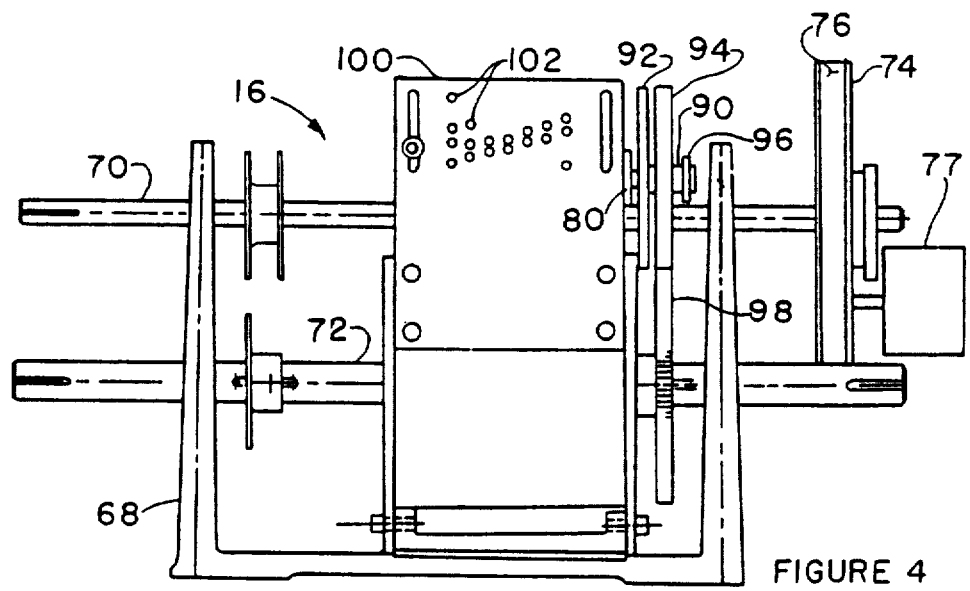
FIG. 4 is an enlarged, front plan view of the drive module of the apparatus of FIG. 1.
Figure 5:
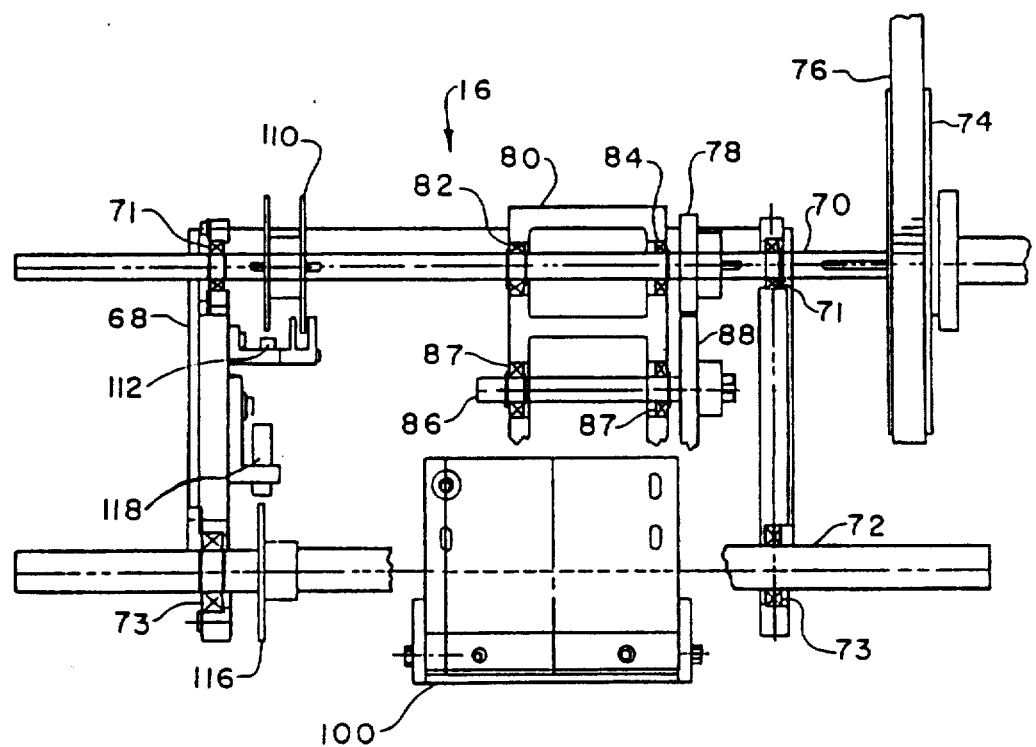
FIG. 5 is a partial cut-away, top plan view of the drive module of FIG. 4.
Figure 6:
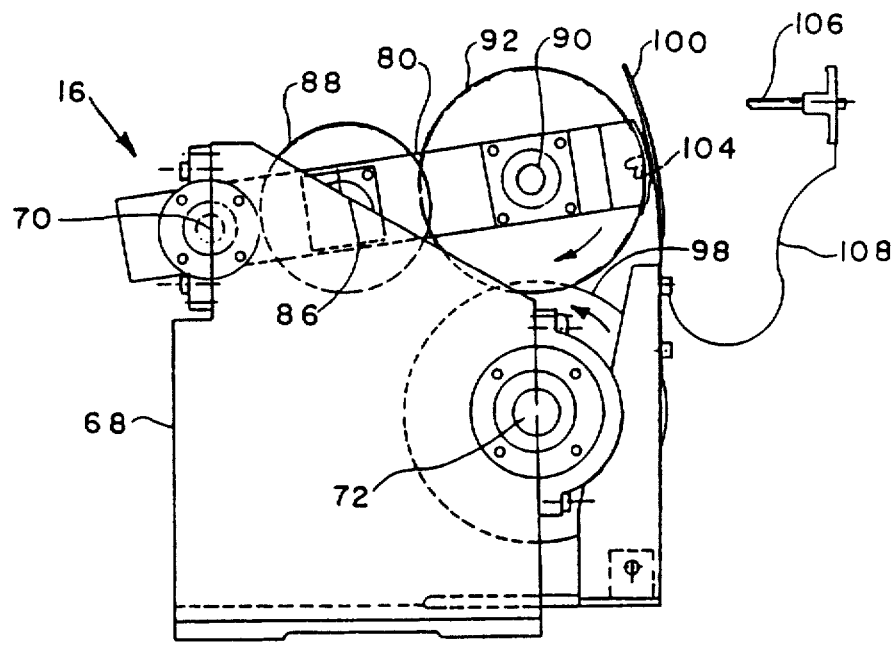
FIG. 6 is a side plan view of the drive module of FIG. 4.

Turning to FIGS. 4 through 6, the drive module 16 of the apparatus 10 is shown in further detail. The drive module 16 comprises a drive module frame 68, which is generally U-shaped, as shown in FIG. 4. A first drive shaft 70 is journaled by bearing supports 71 to the back, top end of the drive module frame 68. A second drive shaft 72 is journaled to the front of the drive module frame 68 below the first drive shaft 70, by bearing supports 73. A pulley 74 is keyed to the first drive shaft 70 between the drive module frame 68 and the adjacent test station 14. A drive belt 76 is mounted over the pulley 74, and is driven by an electric motor 77 to drive the first drive shaft 70. As shown in FIG. 1, the first drive shaft 70 is coupled to the second sample wheel drive shaft 28, to drive the sample wheels 24.

The drive module 16 further comprises a first gear 78 keyed to the drive shaft 70, as shown in FIG. 5. A gear frame 80 is journaled about the first drive shaft 70 adjacent to the first gear 78, by bearing supports 82 and 84. The gear frame 80 extends outwardly from the drive shaft 70 toward the front end of the frame 68, as shown in FIG. 6, and is pivotable about the drive shaft 70. The drive module 16 further comprises a second gear shaft 86, which is spaced inwardly from the drive shaft 70, and journaled to the gear frame 80 by bearing supports 87, as shown in FIG. 5. A second gear 88 is keyed to the free end of the second gear shaft 86, and is dimensioned to mesh with the first gear 78.

The drive module 16 further comprises a third gear shaft 90, spaced adjacent to the second gear shaft 86, and journaled to the free end of the gear frame 80, as shown in FIGS. 4 and 6. A third gear 92 is keyed to the free end of the third gear shaft 90, and is located and dimensioned to mesh with the second gear 88, as shown in FIG. 6. A fourth gear 94 is keyed to the free end of the third gear shaft 90 and spaced apart from the third gear 92, as shown in FIG. 4. A gear nut 96 is threaded to the free end of the gear shaft 90, to lock the fourth gear 94 onto the shaft. As shown in FIG. 4, the outside surface of the gear nut 96 is knurled so that the gear nut can be manually threaded to the shaft 90. The fourth gear 94 can thus be easily removed from the gear shaft 90 and replaced by a different size gear to change the gear ratio between the first drive shaft 70 and the second drive shaft 72, as will be described further below.

The drive module 16 further comprises a fifth gear 98 keyed to the second drive shaft 72 and located immediately below the fourth gear 94. As shown in FIGS. 4 and 6, the fifth gear 98 is dimensioned to mesh with the fourth gear 94. The fifth gear 98 is thus driven by the fourth gear 94 to drive the second drive shaft 72. The second drive shaft 72 is in turn coupled to the grindstone drive shaft 22, as shown in FIG. 1, to drive the grindstones 20 of the test stations 14.

A retaining plate 100 is mounted to the front end of the drive module frame 68, and extends upwardly adjacent to the free end of the gear frame 80. The retaining plate 100 defines a plurality of round holes 102 extending therethrough, as shown in FIG. 4. The gear frame 80 also defines a hole in its free end 104 (shown in phantom), which has a diameter dimensioned about the same size as the diameter of each hole 102. As shown in FIG.

6, the drive module 16 further comprises a retaining pin 106, which is dimensioned to fit through any of the holes 102 and into the hole 104 of the gear frame 80. The retaining pin 106 is coupled to the retaining plate 100 by a cord 108. The gear frame 80 is thus locked relative to the retaining plate 100, by inserting the retaining pin 106 through one of the holes 102 and into the hole 104.

The gear ratio between the first drive shaft 70 and the second drive shaft 72 and, therefore, the ratio of the velocity of the sample wheels 24 to the velocity of the grindstones 20, is adjustable by using different size gears for the fourth gear 94. The fourth gear 94 is replaced by removing the gear nut 96 and pivoting the gear frame 80 upwardly about the drive shaft 70. The fourth gear 94 is thus moved out of engagement with the fifth gear 98. The fourth gear 94 is then pulled off of the shaft 90, and replaced by a new gear 94 that is locked onto the end of the shaft 90 by the gear nut 96. Once the new fourth gear 94 is lowered into engagement with the fifth gear 98, the gear frame 80 is locked in place by inserting the pin member 106 through the appropriate hole 102. The hole 102 in turn directs the free end of the pin member 106 into the hole 104 of the gear frame.

As shown in FIG. 5, the drive module 16 also comprises a first disk 110 keyed to the first drive shaft 70, adjacent to the left leg of the drive module frame 68. A first optical sensor 112 is mounted to the drive module frame 68 adjacent to the first disk 110. The optical sensor 112 detects the rotational speed and counts the revolutions of the first disk 110 and first drive shaft 70 and, therefore, the sample wheels 24. The first optical sensor 112 generates output signals to a first digital display 114, shown in FIG. 1, which displays the velocity and the number of revolutions of the sample wheels 24.

The drive module 16 further comprises a second disk 116 keyed to the second drive shaft 72, adjacent to the left leg of the drive module frame 68. A second optical sensor 118 is mounted to the drive module frame 68 adjacent to the second disk 116. The second optical sensor 118 detects the rotational velocity and counts the revolutions of the second disk 116 and second drive shaft 72 and, therefore, the grindstones 20. The second sensor 118 generates output signals to a digital display 120, shown in FIG. 1, which displays the velocity and the number of revolutions of the grindstones 20.

In the operation of the apparatus 10, the drive module 16 drives the grindstones 20 and the sample wheels 24 of the test stations 14. The sample wheels are thus abraded against the respective grindstones to provide abrasion data for the compound of the sample wheels. When the electric motor 77 is started, the pulley 74 of the drive module 16 drives the first drive shaft 70. The first drive shaft 70 drives the second sample wheel drive shaft 28 which, in turn, drives the second sprocket 32 of each test station 14. Each second sprocket 32, therefore, rotates the respective sample wheel drive belt 34, which in turn rotates the first sprocket 31, and drives the respective sample wheel 24.

The electric motor 77 also rotates the grindstones 20 by driving the first drive shaft 70, which drives the first gear 78. The first gear 78 drives the second gear 88 which, in turn, drives the third gear 92 and fourth gear 94. The fourth gear 94 drives the fifth gear 98 which, in turn, drives the second drive shaft 72. The drive shaft 72 is coupled to the grindstone drive shaft 22 which, in turn, rotatably drives the grindstones 20 of the test stations 14. As indicated by the arrows shown in FIG. 2, the sample wheels 24 and grindstones 20 are rotatably driven in opposite directions. Because all of the sample wheels 24 are driven by the first drive shaft 70, all of the sample wheels are driven at the same rotational speed. Likewise, because the grindstones 20 are all driven by the second drive shaft 72, all of the grindstones are driven at the same rotational speed. The rate of abrasion of each sample wheel 24 at each test station 14, is set by controlling a ratio of the linear (or tangential) velocity of the sample wheels 24 to the linear (or tangential) velocity of the grindstones 20, which is referred to as the slip value (S). The slip value (S) is defined as follows:

$$S = \frac{[V_S - V_G]}{V_S} \cdot 100(\%) \qquad (1)$$

where
  $V_S$ is the linear velocity of the abraded surfaces of the sample wheels 24; and
  $V_G$ is the linear velocity of the abrading surfaces of the grindstones 20.

The slip value (S) is controlled by selecting an appropriate size gear for the fourth gear 94. Preferably, the apparatus 10 can be employed with a number of different size fourth gears 94 so that the slip value (S) and, therefore, the rate of abrasion may be set at incremental steps within the range of about −30% to 30% slip.

In accordance with a method of the present invention, the apparatus 10 is employed to measure the irregular wear resistance of tire tread compounds. In one example of the present invention, three different tire tread compounds are simultaneously abraded in the apparatus 10, as hereinafter described. The three compounds are successively abraded at three different slip values, which are about 7%, 13% and 21%. The tire tread compounds are thus abraded under relatively low, medium, and high levels of abrasion severity, respectively. Based on the abrasion data, the irregular wear resistance of the tire tread compounds is then measured, as described below.

Figure 7:
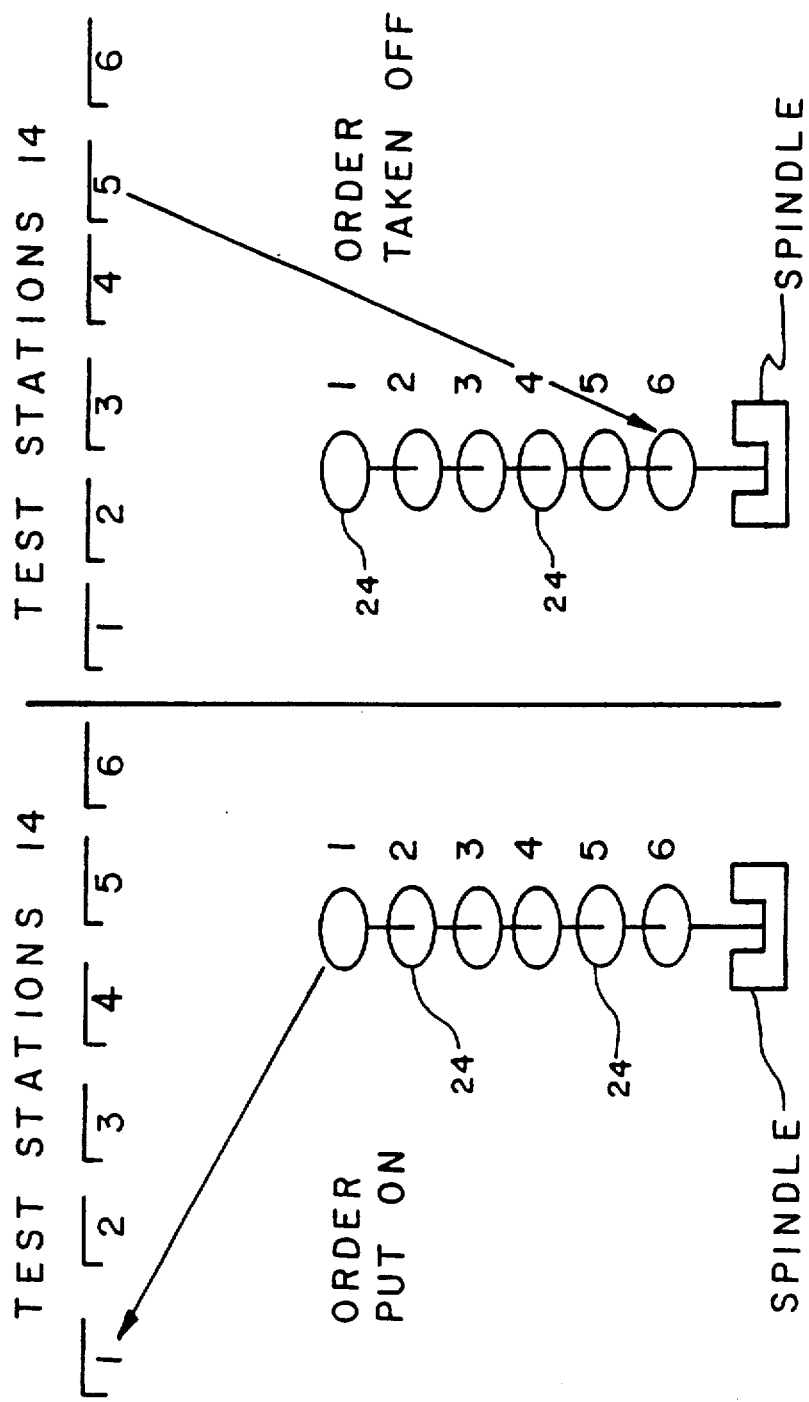
FIG. 7 is a partial schematic illustration of the apparatus of FIG. 1 illustrating the order of abrading several sample wheels in accordance with the method of the present invention.

In FIG. 7, the order of abrading the sample wheels 24 in the test stations 14 is illustrated schematically. Three groups of sample wheels 24 are compression molded, as described above, each group being molded from a different tire tread compound. The three tire tread compounds each contain a different type of carbon black, and are labeled as $CB_1$, $CB_2$ and $CB_3$, respectively. Some of the sample wheels 24 of each compound are used as runners, Which are abraded against the grindstones 20. The other sample wheels 24 are used as dummies, which are only abraded during a conditioning step, and are then simply maintained within the cabinet 12 while abrading the runners during the test. The core 25 of each sample wheel 24 (both runners and dummies) is marked with a number so that each sample wheel can be identified throughout the test.

The dummies are weighed when the runners are weighed during the test, and the weight gain or loss for the dummies is used to correct or adjust the measured weight loss for the runners. An electronic balance accurate to about 0.1 mg is preferably used to weigh the sample wheels 24. The diameters of the sample wheels are measured preferably with a laser micrometer, such as the Zygo laser micrometer, model no. 1201B, manufactured by the Zygo Co. of Middlefield, Conn. Three measurements are taken at substantially equal intervals along the circumference of each runner, and the measurement used is the average of the three measurements taken.

The number of dummies per group of runners is preferably determined as follows: if one batch of a compound is tested, there are four runners and one dummy; if two batches of a given compound are tested (replicate batches), there are three runners and one dummy for each batch; and if three batches of a given compound are tested, there are two runners and one dummy for each batch. Preferably, an even number of sample wheels 24 of each given compound is tested; one-half of the sample wheels 24 can be abraded on the test stations 14 on the left bank of the apparatus 10, and the other half can be abraded on the test stations 14 on the right bank.

The number of sample wheels 24 abraded for a given compound depends on the discrimination required between compounds. For example, if two sample wheels are tested, the deviation from the mean is usually about 3-5%; whereas if five sample wheels are tested, the deviation from the mean is usually on the order of about 2-3%.

The sample wheels 24 are placed on spindles in randomized order, with six wheels per spindle, as indicated in FIG. 7. The dummy wheels are placed on separate spindles (not shown). FIG. 7 illustrates only six of the test stations 14, which may be either the six left bank or six right bank test stations. However, the runners for the other bank of test stations 14 (not shown) are abraded in the same manner as those illustrated in FIG. 7.

The sample wheels 24 (both runners and dummies) are then conditioned by placing all of the spindles in an oven at about 100° C. for about 24 hours. The cabinet 12 is preheated to about 49° C., and upon removal from the oven, the spindles are then placed within the heated cabinet 12 for about 30 minutes. The runners and dummies are then each mounted in a respective test station 14, and conditioned for about 10,000 revolutions at 860 RPM, with the temperature within the cabinet 12 set at about 49° C. The fourth gear 94 is sized so that the slip value is about 7%.

After conditioning, the wheels are permitted to cool to room temperature, however, all wheels (runners and dummies) are maintained at the same temperature throughout the test. The abrading surfaces of the grindstones 20 are then cleaned with a wire brush. The cabinet 12 is vacuumed to remove any loose particles collected during the conditioning step. And the rubber bands 54 on the dust transfer wheels 40 are replaced.

The diameters of the runners are then measured as described above. The weight of each of the sample wheels 24, both runners and dummies, is then measured and recorded to the nearest 0.1 mg. The cabinet 12 is then preheated for at least two hours at about 49° C. All of the sample wheels 24, both runners and dummies, are then heated inside the cabinet 12 for at least 30 minutes.

The runners are then mounted on the respective sample wheel drive shafts 26, in the order indicated in FIG. 7. The fourth gear 94 is sized so that the slip value is about 7%, and the interior of the cabinet 12 is maintained at about 49° C. The runners are then abraded for about 15,000 revolutions at 860 RPM. Once the runners are stopped, they are removed from the respective test stations 14 and placed back on the spindles, in the order indicated in FIG. 7. The spindle of runners is then mounted again onto the respective test stations 14, in the order indicated in FIG. 7, and abraded again for about 15,000 revolutions at 860 RPM. Therefore, each runner 24 is abraded in a new test station 14 with each abrading step.

When the runners are taken off of each test station 14, they are flipped over and then placed on the spindle. The direction of rotation of the runners is therefore reversed between each successive test station 14, to avoid errors due to variations between individual test stations. Each spindle of sample wheels 24 is abraded on six different test stations 14, flipping the sample wheels when moving them from one test station to the next. Each sample wheel 24 is therefore abraded on each of the grindstones 20 on one bank of the apparatus 10. After six rotations between test stations, the runners should be mounted on the spindles in the same order as prior to the initial run.

Each runner is therefore abraded for a total of about 90,000 revolutions at the first slip value (7%). Then, all of the sample wheels 24 are removed from the apparatus 10 and cooled to room temperature. The grindstones 20 are wire brushed, the cabinet 12 is vacuumed to remove loose particles, and the rubber bands 54 are changed. Then, the diameter of each runner, and the weights of all sample wheels, both runners and dummies, are again measured and recorded, as described above. However, the average weight loss or gain for all the dummies of each compound is subtracted from or added to, respectively, the weight loss of the runners of each of the respective compounds, to more accurately determine the weight loss due to abrasion.

The fourth gear 94 is then changed so that the slip value is about 13%, and the temperature of the cabinet 12 is lowered to about 46° C. The runners are then each abraded six more times in six different test stations 14, in the same manner as described above. However, during each abrading step, each runner is rotated through about 2400 revolutions at 860 RPM. Therefore, each runner is rotated through a total of about 14,400 revolutions at the second slip value (13%). Then, all of the sample wheels 24 are removed from the apparatus 10 and cooled to room temperature. The grindstones 20 are wire brushed, the cabinet 12 is vacuumed to remove loose particles, and the rubber bands 54 are changed. The diameter of each runner, and the weights of both the runners and dummies, are then measured and recorded, as described above.

The fourth gear 94 is then changed so that the slip value is about 21%. The temperature of the cabinet 12 is maintained at about 46° C. The runners are then each abraded six more times in six different test stations 14, in the same manner as described above. However, each runner is rotated through about 2,000 revolutions at 860 RPM with each grindstone. Therefore, each runner is rotated through a total of about 12,000 revolutions at the third slip value (21%). Then, the diameter of each runner, and the weights of both the runners and dummies, are measured and recorded, as described above.

The wear rate (W) of each compound ($CB_1$, $CB_2$ and $CB_3$) is then calculated for each slip value. The wear rate (W) is the average volume loss per unit of travel (cc/cm) of the runners for each given compound. The volume loss (cc) is determined based on the measured weight loss of each runner (corrected based on the weight change of the corresponding dummies) and the density of the compound. The travel of each runner (cm) at each slip value is calculated by determining the average of the runner's diameter measurement before abrasion and the runner's diameter measurement after abrasion at that slip value. The average diameter measurement is then used to determine the average circumference of the runner at that slip value. The average circumference is then multiplied by the number of revolutions, to determine the travel of the runner (cm) at that slip value.

A Laboratory Abrasion Index (LI) is determined for each tested compound at each slip value:

$$LI = \frac{W_{reference}}{W_{sample}} \quad (2)$$

where $W_{reference}$ is the wear rate of the sample wheels 24 of a reference compound; and $W_{sample}$ is the wear rate of the sample sheets 24 of each sample compound.

The $CB_1$ compound is a reference compound, and is abraded for comparison to the other compounds tested. Therefore, the Laboratory Abrasion Index (LI) for the $CB_1$ compound is 100, as shown in the table below.

If the effect of the test compound's hardness on wear rate is to be considered, then the footprint area of contact between the abraded sample wheels 24 and their respective grindstones 20 are also measured. A footprint is measured by inking several sections of the abraded surface of a sample wheel 24. The sample wheel 24 is mounted in a test station 14 and a sheet of paper is placed over the abrading surface of the respective grindstone. The inked surfaces of the sample wheel are then lowered into engagement with the sheet of paper, under the force of the respective counterweight 29. The surface areas of the inked footprints on the paper are then measured, preferably with a Kontron Image Analysis System, model no. KAT 386, manufactured by the Kontron Co. of Mountain View, Calif.

The footprint areas are preferably measured when the initial weights and diameters of the sample wheels 24 are measured at the start of the abrasion test. The Laboratory Abrasion Index (LI) can then be adjusted based on the ratio of the average footprint area of the sample wheels of the test compound, to the footprint area of the sample wheel or wheels of the reference compound.

The calculated results based on the data collected in abrading the three groups of sample wheels 24, are summarized in the table below:

|  | Wear Rate (W) (cc/cm) 7% slip | Laboratory Abrasion Index (LI) 7% slip | Wear Rate (W) (cc/cm) 13% slip | Laboratory Abrasion Index (LI) 13% slip | Wear Rate (W) (cc/cm) 21% slip | Laboratory Abrasion Index (LI) 21% slip |
| --- | --- | --- | --- | --- | --- | --- |
| $CB_1$ | 4.56 E-8 | 100 | 2.42 E-7 | 100 | 8.45 E-7 | 100 |
| $CB_2$ | 4.94 E-8 | 92 | 2.45 E-7 | 99 | 6.43 E-7 | 131 |
| $CB_3$ | 4.61 E-8 | 98 | 2.48 E-7 | 98 | 7.10 E-7 | 119 |

As shown in the table, the Wear Rate (W) increases with increasing slip values for all three compounds. However, the important feature of the data is that the $CB_2$ compound demonstrates a significantly higher Laboratory Abrasion Index (LI) than does either the $CB_1$ or $CB_3$ compounds at the highest level of abrasion severity (21% slip). At the 7% and 13% slip values, on the other hand, the Laboratory Abrasion Index (LI) of the $CB_2$ compound is much closer to that of the $CB_1$ and $CB_3$ compounds. Therefore, the test results indicate that the $CB_2$ compound exhibits better abrasion resistance than does the $CB_1$ or $CB_3$ compounds under high severity abrasion conditions. Accordingly, the $CB_2$ compound will likely exhibit better irregular wear resistance than either the $CB_1$ or $CB_3$ compounds.

One advantage of the method of the present invention, is that the invention can be employed to solve irregular wear problems with existing tires. For example, if a tire with an existing tread design turns out to have an irregular wear problem, the method of the present invention can be employed to find another tire tread compound, or another type of carbon black to be used in a tire tread compound, that will exhibit better abrasion resistance at high severity levels of abrasion.

Known methods of abrading, on the other hand, which do not precisely determine abrasion resistance at both high and low severity levels of abrasion, would likely not be helpful in pointing to the tire tread compound to solve the irregular wear problem. Indeed, in the example described above, the known methods would likely indicate that the $CB_2$ compound, $CB_1$ compound, and $CB_3$ compound exhibit substantially the same abrasion resistance when, in fact, the abrasion resistance of the $CB_2$ compound is substantially better at higher levels of abrasion severity.

What is claimed is:

1. A method of abrading a tire tread compound to determine the irregular wear characteristics of the compound, comprising the following steps:

weighing at least two sample wheels, wherein each sample wheel includes a tire tread compound;

abrading the tire tread compound of each sample wheel by rotating each sample wheel in engagement with a respective grindstone at a first slip value, the slip value being based on the difference between the velocities of the sample wheels and the grindstones;

weighing each sample wheel again to measure the abrasion resistance of the tire tread compound at the first slip value and generating a first index value indicative thereof, the index value being based on a comparison of the abrasion resistance of the tire tread compound to the abrasion resistance of a reference compound at the same slip value;

abrading the tire tread compound of each sample wheel by rotating each sample wheel in engagement with a respective grindstone at a second slip value, the second slip value causing a higher level of abrasion severity than the first slip value;

weighing each sample wheel again to measure the abrasion resistance of the tire tread compound at the second slip value and generating a second index value indicative thereof;

abrading the tire tread compound of each sample wheel by rotating each sample wheel in engagement with a respective grindstone at a third slip value, the third slip value causing a higher level of abrasion severity than the second slip value; and weighing each sample wheel again to measure the abrasion resistance of the tire tread compound at the third slip value and generating a third index value indicative thereof, and comparing the first, second and third index values to each other and/or to the corresponding index values of other tire tread components tested to determine the irregular wear characteristics of the tire tread compound.

2. A method of abrading a tire tread compound as defined in claim 1, wherein
each slip value is based on the difference between the velocities of the sample wheels and grindstones divided by the velocity of the sample wheels.

3. A method of abrading a tire tread compound as defined in claim 2, wherein
the first slip value is within the range of about 5 to 9%;
the second slip value is within the range of about 9 to 17%; and
the third slip value is within the range of about 17 to 30%.

4. A method of abrading a tire tread compound as defined in claim 1, further comprising the following steps:
abrading the tire tread compound of each sample wheel by rotating each sample wheel in engagement with a plurality of respective grindstones at each of the first, second, and third slip values.

5. A method of abrading a tire tread compound as defined in claim 1, further comprising the following step:
conditioning the sample wheels by rotating each sample wheel in engagement with a respective grindstone prior to abrading the tire tread compound of each sample wheel at the first slip value.

6. A method of abrading a carbon black containing compound to determine its irregular wear resistance, comprising the following steps:
abrading each of a plurality of sample members in rotating engagement with a respective abrasive member at a first slip value, wherein a layer of each sample member is made of a carbon black containing compound, and the slip value is based on the difference between the velocity of the sample members and the velocity of the abrasive members;
abrading each sample member in rotating engagement with at least one other abrasive member at the first slip value;
generating data indicative of the loss of the carbon black containing compound of each sample member at the first slip value and calculating a first index value indicative thereof, the index value being based on a comparison of the loss of the carbon black containing compound to the loss of a reference compound at the same slip value;
abrading each sample member in rotating engagement with a respective abrasive member at a second slip value, the second slip value causing a greater degree of abrasion severity than the first slip value;
abrading each sample member in rotating engagement with at least one other abrasive member at the second slip value;
generating data indicative of the loss of the carbon black containing compound of each sample member at the second slip value and calculating a second index value indicative thereof;
abrading each sample member in rotating engagement with a respective abrasive member at a third slip value, the third slip value causing a greater degree of abrasion severity than the second slip value;
abrading each sample member in rotating engagement with at least one other abrasive member at the third slip value; and
generating data indicative of the loss of carbon black containing compound of each sample member at the third slip value and calculating a third index value indicative thereof, and comparing the first, second and third index values to each other and/or to the corresponding index values of other carbon black containing compounds tested to determine the irregular wear resistance of the carbon black containing compound.

7. A method of abrading a carbon black containing compound as defined in claim 6, wherein
each slip value is based on the difference in velocity of the sample members and the abrasive members divided by the velocity of the sample members.

8. A method of abrading a carbon black containing compound as defined in claim 6, wherein
the first slip value is within the range of about 5 to 9%; and each sample member is rotated within the range of about 10,000 to 20,000 revolutions with each abrasive member at the first slip value.

9. A method of abrading a carbon black containing compound as defined in claim 6, wherein
the second slip value is within the range of about 9 to 17%; and
each sample member is rotated within the range of about 1000 to 5000 revolutions with each abrasive member at the second slip value.

10. A method of abrading a carbon black containing compound as defined in claim 6, wherein
the third slip value is within the range of about 17 to 30%; and
each sample member is rotated within the range of about 500 to 4500 revolutions with each abrasive member at the third slip value.

11. A method of abrading a carbon black containing compound as defined in claim 6, wherein
each sample member is rotated in engagement with at least five different abrasive members at each slip value.

12. A method of abrading a carbon black containing compound as defined in claim 11, wherein
each sample member is rotated within the range of about 760 to 960 RPM with each respective abrasive member.

13. A method of abrading a carbon black containing compound as defined in claim 6, further comprising the following step:
controlling the ambient temperature of the sample members and abrasive members to control the degree of abrasion of the sample members by the abrasive members.

14. A method of abrading a carbon black containing compound as defined in claim 13, wherein
the ambient temperature is maintained within the range of about 40° to 55' C.

15. A method of abrading a carbon black containing compound as defined in claim 6, wherein the data generated is indicative of the volume loss per unit of travel of each sample member at each slip value, the volume loss being based on the weight loss of each sample member at the respective slip value and the density of the carbon black containing compound, and each index value is equal to the volume loss per unit of travel of a reference compound divided by the volume loss per unit of travel of the carbon black containing compound.

16. A method of abrading a tire tread compound to determine the irregular wear resistance of the compound, comprising the following steps:
   weighing at least two test members, an outer surface of each test member being made of a tire tread compound to be abraded;
   rotating the outer surface of each test member in engagement with a an abrasive member at a first slip value to abrade the tire tread compound, the difference between the velocities of the test members and the abrasive members defining a first slip value;
   weighing each test member to measure its value loss due to abrasion at the first slip value and generating a first index value indicative thereof, the first index value being based on a comparison of the volume loss due to abrasion of the tire tread compound to the volume loss due to abrasion of a reference compound;
   rotating the outer surface of each test member in engagement with an abrasive member to abrade the tire tread compound, the difference between the velocities of the test members and the abrasive members defining a second slip value, the second slip value causing an increased wear rate over the first slip value;
   weighing each test member to measure its volume loss due to abrasion at the second slip value and generating a second index value indicative thereof;
   rotating the outer surface of each test member in engagement with an abrasive member to abrade the tire tread compound, the difference between the velocities of the test members and the abrasive members defining a third slip value, the third slip value causing an increased wear rate over the second slip value; and
   weighing each test member to measure its volume loss due to abrasion at the third slip value and generating a third index value indicative thereof, and comparing the first, second and third index values to each other and/or to the corresponding index values of other tire tread compounds tested to determine the irregular wear resistance of the tire tread compound.

17. A method of abrading a tire tread compound as defined in claim 16, wherein
   each slip value is based on the difference between the velocity of the test members and the abrasive members, divided by the velocity of the test members.

18. A method of abrading a tire tread compound as defined in claim 17, wherein
   the first slip value is within the range of about 5 to 9%;
   the second slip value is within the range of about 9 to 17%; and
   the third slip value is within the range of about 17 to 30%.

19. A method of abrading a tire tread compound as defined in claim 16, further comprising the following step:
   rotating the outer surface of each test member in engagement with a plurality of abrasive members at each of the first, second, and third slip values.

20. A method of abrading a tire tread compound under both high and low severity conditions to generate data indicative of the irregular wear characteristics of the tire tread compound, comprising the following steps:
   weighing each of a plurality of sample members, wherein an outer surface of each sample member is made of a tire tread compound to be abraded;
   rotating the outer surface of each sample member in engagement with a plurality of respective abrasive members at a first slip value to abrade the tire tread compound, the slip value being based on the difference between the velocity of the sample members and the velocity of the abrasive members;
   generating data indicative of the loss of the tire tread compound due to abrasion at the first slip value and calculating a first index value indicative thereof, the index value being based on a comparison of the loss of the tire tread compound due to abrasion to the loss of a reference compound due to abrasion at the same slip value;
   rotating the outer surface of each sample member in engagement with a plurality of respective abrasive members to abrade the tire tread compound at a second slip value, the second slip value causing a higher level of abrasion severity than the first slip value;
   generating data indicative of the loss of the tire tread compound due to abrasion at the second slip value and calculating a second index value indicative thereof;
   rotating the outer surface of each sample member in engagement with a plurality of respective abrasive members to abrade the tire tread compound at a third slip value, the third slip value causing a higher level of abrasion severity than the second slip value; and
   generating data indicative of the loss of the tire tread compound due to abrasion at the third slip value and calculating a third index value indicative thereof, and comparing the first, second and third index values to each other and/or to corresponding index values of other tire tread compounds tested to determine the irregular wear characteristics of the tire tread compound.

21. A method of abrading as defined in claim 26, wherein
   each index value is equal to the wear rate of a reference compound divided by the wear rate of the respective compound at the respective slip value.

22. A method of abrading a tire tread compound to determine the irregular wear characteristics of the compound, comprising the following steps:
   weighing each of a plurality of test pieces, wherein an outer surface of each test piece is made of a tire tread compound to be abraded;
   rotating the outer surface of each test piece in engagement with a plurality of abrasive members to abrade the tire tread compound, the difference in the velocity of the test pieces and the velocity of the abrasive members, divided by the velocity of the test pieces, defining a first slip value, the first slip value being less than about 15%;
   weighing each of the test pieces to measure the loss of the tire tread compound due to abrasion at the first slip value and generating a first index value indicative thereof, the index value being based on a comparison of the loss of the tire tread compound due to abrasion to the loss of a reference compound due to abrasion at the same slip value;

rotating the outer surface of each test piece in engagement with a plurality of abrasive members to abrade the tire tread compound at a second slip value, the second slip value being greater than about 18%;

weighing each of the test pieces to measure the loss of tire tread compound due to abrasion at the second slip value and generating a second index value indicative thereof; and comparing the first and second index values to each other and/or to the corresponding index values of other tire tread compounds tested to determine the irregular wear characteristics of the tire tread compound.

23. A method of abrading the tire compound as defined in claim 22, wherein each test piece is rotated with each respective abrasive member within the range of about 10,000 to 20,000 revolutions and at a speed within the range of about 760 to 960 RPM at the first slip value; and each test piece is rotated within the range of about 1,000 to 5,000 revolutions and at a speed within the range of about 760 to 960 RPM at the second slip value.

24. A method of abrading to determine the irregular wear characteristics of tire tread compounds, comprising the following steps:

abrading each of a plurality of sample members in engagement with a respective abrasive member at a first slip value, wherein the portion of each sample member being abraded is made of a carbon black containing compound, and the slip value is based on the difference between the velocities of the sample members and the abrasive members;

generating data indicative of the wear rate for each compound at the first slip value and calculating a first index value therefrom, the wear rate being based on the volume loss of each sample member made of the respective compound at the first slip value and the index value being based on a comparison of the wear rate of the respective compound to the wear rate of a reference compound at the same slip value;

abrading each sample member in engagement with a respective abrasive member at a second slip value, the second slip value causing a greater degree of abrasion severity than the first slip value;

generating data indicative of the wear rate for each compound at the second slip value and calculating a second index value therefrom;

abrading each sample member in engagement with a respective abrasive member at a third slip value, the third slip value causing a greater degree of abrasion severity than the second slip value;

generating data indicative of the wear rate for each compound at the third slip value and calculating a third index value therefrom; and comparing the first, second and third index values for each compound to each other and/or to the corresponding index values of other tire tread compounds tested to determine the irregular wear characteristics of each respective compound.

25. A method of abrading as defined in claim 24, wherein the first slip value is within the range of about 5 to 9%;

the second slip value is within the range of about 9 to 17%; and the third slip value is within the range of about 17 to 30%.

26. A method of abrading as defined in claim 25, wherein the wear rate is based on the volume loss per unit of travel of each sample member made of the respective compound at the respective slip value.

* * * * *